(12) United States Patent
Edwards et al.

(10) Patent No.: US 10,546,068 B2
(45) Date of Patent: *Jan. 28, 2020

(54) CONTEXTUAL VALIDATION OF SYNONYMS IN OTOLOGY DRIVEN NATURAL LANGUAGE PROCESSING

(71) Applicant: International Business Machines Corporation, Armonk, NY (US)

(72) Inventors: Stephen J. Edwards, Ward, CO (US); Ahmed M. Nassar, Katy, TX (US); Craig M. Trim, Sylmar, CA (US); Albert T. Wong, Hacienda Heights, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,186

(22) Filed: Oct. 29, 2018

(65) Prior Publication Data

US 2019/0065475 A1    Feb. 28, 2019

Related U.S. Application Data

(63) Continuation of application No. 15/090,699, filed on Apr. 5, 2016, now Pat. No. 10,169,335, which is a (Continued)

(51) Int. Cl.
*G06F 17/27* (2006.01)
*G06F 17/24* (2006.01)

(52) U.S. Cl.
CPC ........ *G06F 17/2795* (2013.01); *G06F 17/241* (2013.01); *G06F 17/2705* (2013.01); *G06F 17/277* (2013.01); *G06F 17/2785* (2013.01)

(58) Field of Classification Search
CPC ... G06F 17/27; G06F 17/2785; G06F 17/2795
(Continued)

(56) References Cited

U.S. PATENT DOCUMENTS 5,469,355 A    11/1995  Tsuzuki
7,058,652 B2 *  6/2006  Czarnecki ............. G06F 16/951
(Continued)

OTHER PUBLICATIONS

Authors et al.: Disclosed Anonymously, ip.com, "Contextual Inference in Underspecified Queries using Ontology-driven NLP", IP.com No. IPCOM000227426D, IP.com Electronic Publication Date May 7, 2013, 3 pages.
(Continued)

*Primary Examiner* — Richemond Dorvil
*Assistant Examiner* — Rodrigo A Chavez
(74) *Attorney, Agent, or Firm* — Maeve M. Carpenter; Maxine L. Barasch; Keohane & D'Alessandro PLLC

(57) ABSTRACT

Embodiments described herein provide approaches for validating synonyms in ontology driven natural language processing. Specifically, an approach is provided for receiving a user input containing a token, structuring the user input into a semantic model comprising a set of classes each containing a set of related permutations of the token, designating the token as a synonym of one of the set of related permutations, annotating the token with a class from the set of classes corresponding to the one of the set of related permutations, and validating the annotation of the token by determining an accuracy of the designation of the token as a synonym of the one of the set of related permutations. In one embodiment, the accuracy is determined by quantifying a linear distance between the token and a contextual token also within the user input, and comparing the linear distance to a pre-specified linear distance limit.

20 Claims, 5 Drawing Sheets

Related U.S. Application Data continuation of application No. 14/084,827, filed on Nov. 20, 2013, now Pat. No. 9,342,502.

(58) Field of Classification Search
USPC .................................................. 704/2, 9, 10
See application file for complete search history.

(56) References Cited

U.S. PATENT DOCUMENTS

| | | | |
|---|---|---|---|
| 7,526,425 | B2 | 4/2009 | Marchisio et al. |
| 7,689,410 | B2 * | 3/2010 | Chang .................... G06F 8/315 704/9 |
| 8,332,434 | B2 | 12/2012 | Salkeld et al. |
| 8,433,715 | B1 | 4/2013 | Mirhaji |
| 8,515,731 | B1 * | 8/2013 | Ramirez Robredo ...................... G06F 17/2854 704/2 |
| 9,342,502 | B2 * | 5/2016 | Edwards ............ G06F 17/2785 |
| 10,169,335 | B2 * | 1/2019 | Edwards ............ G06F 17/2785 |
| 2002/0022955 | A1 * | 2/2002 | Troyanova ......... G06F 17/271 704/9 |
| 2011/0040552 | A1 * | 2/2011 | Van Guilder ........ G06F 17/246 704/4 |
| 2011/0145268 | A1 * | 6/2011 | Agarwal ............ G06F 16/3335 707/765 |
| 2012/0066661 | A1 | 3/2012 | Balani et al. |
| 2013/0096947 | A1 | 4/2013 | Shah et al. |
| 2014/0188456 | A1 * | 7/2014 | Rylov ................ G06F 17/2735 704/9 |
| 2015/0142419 | A1 | 5/2015 | Edwards et al. |
| 2015/0339290 | A1 | 11/2015 | Mueller et al. |
| 2016/0217131 | A1 | 7/2016 | Edwards et al. |
| 2016/0350395 | A1 | 12/2016 | Gupta et al. |
| 2017/0169012 | A1 | 6/2017 | Li |

OTHER PUBLICATIONS

Jacqueline R. Reich, "At the Intersection of Ontological Design Patterns and (Semi-) Automatic Database Annotation", Idea Group Publishing, Copyright 2001, 6 pages.
Rodrigo A. Chavez, USPTO Office Action, U.S. Appl. No. 14/084,827, Notification Date Jun. 12, 2015, 19 pages.
Rodrigo A. Chavez, USPTO Final Office Action, U.S. Appl. No. 14/084,827, Notification Date Dec. 9, 2015, 23 pages.
Rodrigo A. Chavez, USPTO Notice of Allowance and Fee(s) Due, U.S. Appl. No. 14/084,827, dated Feb. 22, 2016, 18 pages.
Rodrigo A. Chavez, USPTO Office Action, U.S. Appl. No. 15/090,699 Notification Date Apr. 12, 2017, 22 pages.
Rodrigo A. Chavez, USPTO Final Office Action, U.S. Appl. No. 15/090,699 Notification Date Nov. 30, 2017 26 pages.
Rodrigo A. Chavez, USPTO Office Action, U.S. Appl. No. 15/090,699 Notification Date Apr. 4, 2018, 23 pages.
Rodrigo A. Chavez, USPTO Notice of Allowance and Fee(s) Due, U.S. Appl. No. 15/090,699, dated Aug. 28, 2018, 16 pages.

* cited by examiner

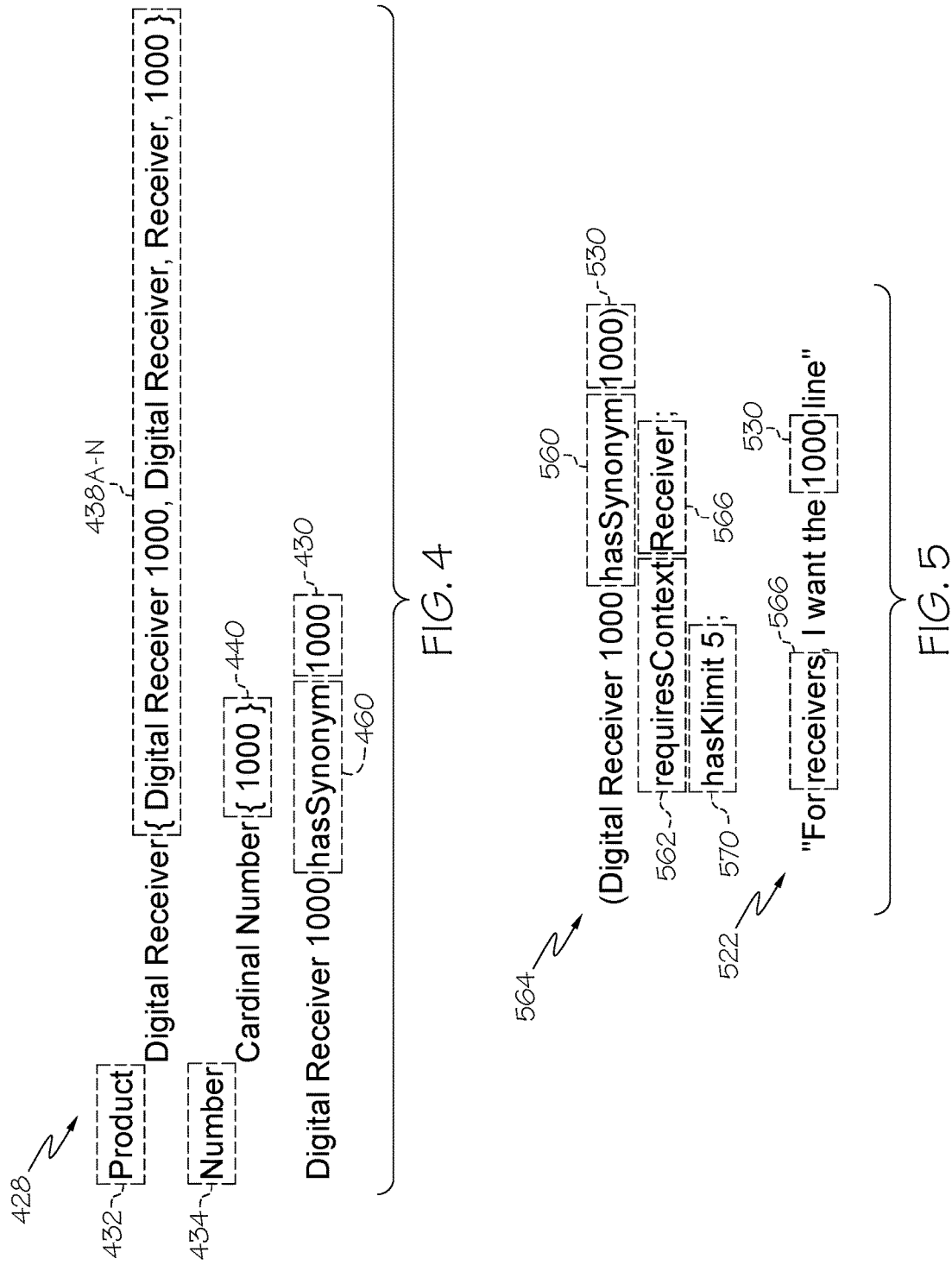

CONTEXTUAL VALIDATION OF SYNONYMS IN OTOLOGY DRIVEN NATURAL LANGUAGE PROCESSING

RELATED U.S. APPLICATION DATA

This patent document is a continuation of, and claims the benefit of, co-pending and co-owned U.S. patent application Ser. No. 15/090,699, filed Apr. 5, 2016, which is a continuation of commonly owned U.S. patent application Ser. No. 14/084,827, filed Nov. 20, 2013, issued May 17, 2016 as U.S. Pat. No. 9,342,502. The entire contents of U.S. patent application Ser. No. 15/090,699 and U.S. patent application Ser. No. 14/084,827 are herein incorporated by reference.

BACKGROUND

1. Field of the Invention

This invention relates generally to ontology driven natural language processing (NLP) and, more specifically, to providing contextual validation of synonyms in ontology driven NLP.

2. Description of the Related Art

A common problem in natural language text is under-specification. For example, when people speak to one another, there is a shared context, which allows an understanding of context-specific words and phrases. When a user interacts with an expert system, a shared context is also desired. However, it is sometimes difficult for a computer to understand language because of under-specification and the lack of shared context.

Currently, NLP can be used to achieve advanced online question answering services. NLP provides technology that attempts to understand and identify the syntactical structure of a language. For example, NLP has been used to identify the parts of speech of one or more terms in a submitted sentence to support the use of sentences as natural language queries against data. However, systems that use NLP to parse and process queries against data, even when the data is highly structured, can suffer from performance problems due to ambiguity in keywords.

Ontology-driven NLP parses natural language text and transposes it into a representation of its meaning, structured around events and their participants. Queries can then be matched to this meaning representation in anticipation of any of the permutations, which surface in the text. However, these permutations can also suffer from under specification, wherein an appropriate context must be assumed to understand a statement or query. This ambiguity as to the assumed context sometimes contributes to inaccurate and undesirable results.

SUMMARY

In general, embodiments described herein provide approaches for validating synonyms in ontology driven natural language processing (NLP). Specifically, an approach is provided for receiving a user input containing a token, structuring the user input into a semantic model comprising a set of classes each containing a set of related permutations of the token, designating the token as a synonym of one of the set of related permutations, annotating the token with a class from the set of classes corresponding to the one of the set of related permutations, and validating the annotation of the token by determining an accuracy of the designation of the token as a synonym of the one of the set of related permutations. In one embodiment, the accuracy is determined by quantifying a linear distance between the token and a contextual token also within the user input, and comparing the linear distance to a pre-specified linear distance limit.

One aspect of the present invention includes a method for providing contextual validation of synonyms in ontology driven natural language processing, the method comprising the computer-implemented steps of: receiving a user input containing a token; structuring the user input into a semantic model comprising a set of classes each containing a set of related permutations of the token; designating the token as a synonym of one of the set of related permutations; annotating the token with a class from the set of classes corresponding to the one of the set of related permutations; and validating the annotation of the token by determining an accuracy of the designation of the token as a synonym of the one of the set of related permutations.

Another aspect of the present invention provides a system for providing contextual validation of synonyms in ontology driven natural language processing (NLP), the system comprising: a memory medium comprising instructions; a bus coupled to the memory medium; and a processor coupled to a NLP engine via the bus that when executing the instructions causes the system to: receive a user input containing a token; structure the user input into a semantic model comprising a set of classes each containing a set of related permutations of the token; designate the token as a synonym of one of the set of related permutations; annotate the token with a class from the set of classes corresponding to the one of the set of related permutations; and validate the annotation of the token by determining an accuracy of the designation of the token as a synonym of the one of the set of related permutations.

Yet another aspect of the present invention provides a computer-readable storage device storing computer instructions, which when executed, enables a computer system to provide contextual validation of synonyms in ontology driven natural language processing, the computer instructions comprising: receiving a user input containing a token; structuring the user input into a semantic model comprising a set of classes each containing a set of related permutations of the token; designating the token as a synonym of one of the set of related permutations; annotating the token with a class from the set of classes corresponding to the one of the set of related permutations; and validating the annotation of the token by determining an accuracy of the designation of the token as a synonym of the one of the set of related permutations.

BRIEF DESCRIPTION OF THE DRAWINGS

FIG. 4 shows a semantic model according to illustrative embodiments;

FIG. 5 shows a restructured semantic model according to illustrative embodiments.

Figure 1:
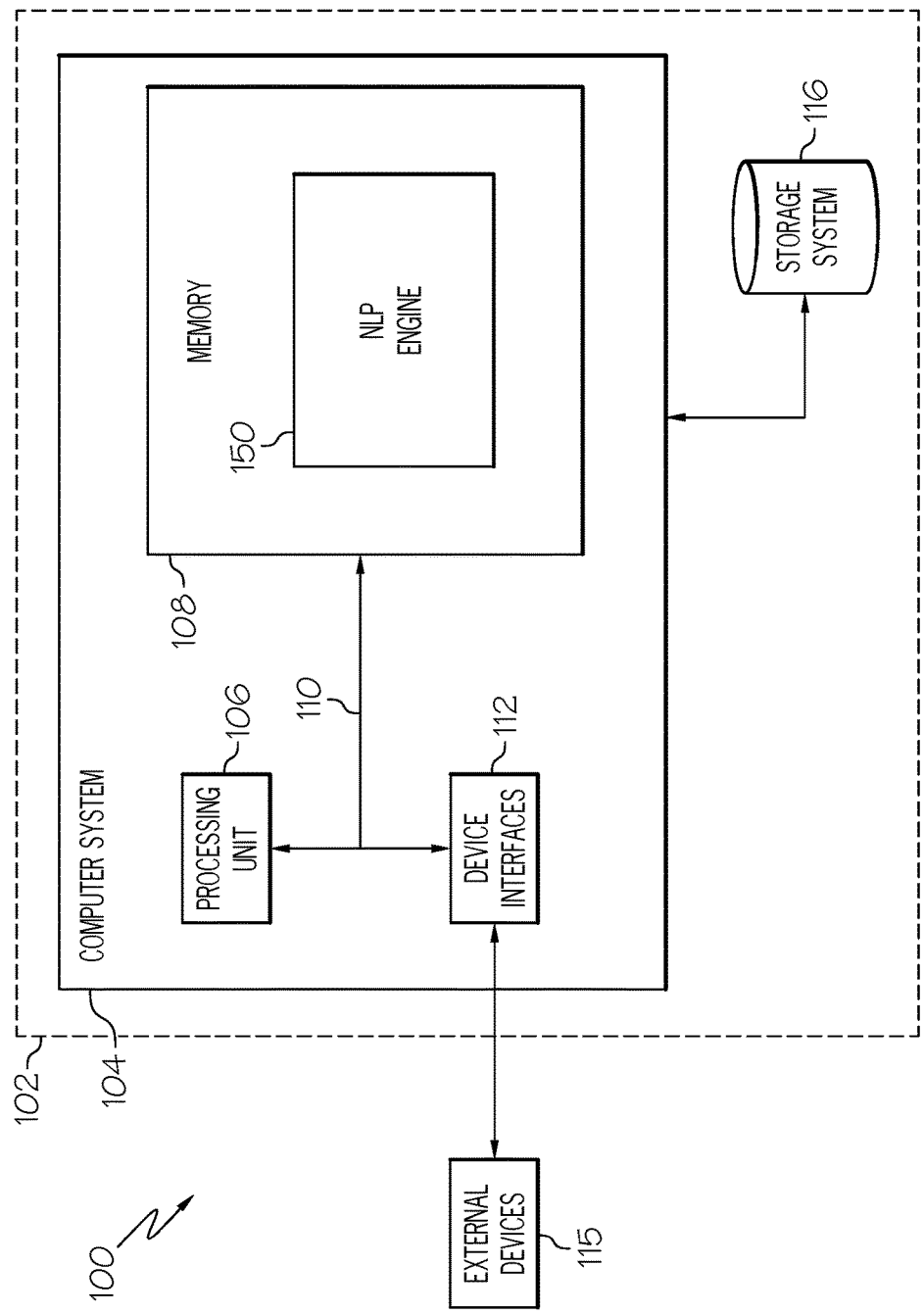
FIG. 1 shows a schematic of an exemplary computing environment according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

The invention will now be described more fully herein with reference to the accompanying drawings, in which exemplary embodiments are shown. This disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "determining," "evaluating," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As mentioned above, embodiments described herein provide approaches for validating synonyms in ontology driven NLP. Specifically, an approach is provided for receiving a user input containing a token, structuring the user input into a semantic model comprising a set of classes each containing a set of related permutations of the token, designating the token as a synonym of one of the set of related permutations, annotating the token with a class from the set of classes corresponding to the one of the set of related permutations, and validating the annotation of the token by determining an accuracy of the designation of the token as a synonym of the one of the set of related permutations. In one embodiment, the accuracy is determined by quantifying a linear distance between the token and a contextual token also within the user input, and comparing the linear distance to a pre-specified linear distance limit. As a result, appropriate semantic ontology terms can be identified for enriching a search query using a semantic annotation form to assists in resolving ontology term ambiguity and to increase the level of confidence in the ontology key terms.

Referring now to FIG. 1, a computerized implementation 100 of the present invention will be described in greater detail. As depicted, implementation 100 includes a computer infrastructure 102 having a computer system 104 deployed therein. This is intended to demonstrate, among other things, that the present invention could be implemented within a network environment (e.g., the Internet, a wide area network (WAN), a local area network (LAN), a virtual private network (VPN), etc.), a cloud-computing environment, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing contextual validation of synonyms in ontology driven natural language processing. It should be understood that any other computers implemented under the present invention may have different components/software, but will perform similar functions. As shown, computer system 104 includes a processing unit 106 capable of communicating with NLP engine 118 stored in memory 108, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing inputs and outputs between external devices 115 and NLP engine 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating NLP engine 118, which is stored in memory 108 and/or storage system 116. While executing computer program code, processing unit 106 can read and/or write data to/from memory 108, storage system 116, and NLP engine 118. Storage system 116 can include VCRs, DVRs, RAID arrays, USB hard drives, optical disk recorders, flash storage devices, and/or any other data processing and storage elements for storing and/or processing data. Although not shown, computer system 104 could also include I/O interfaces that communicate with one or more external devices 115 (e.g., a keyboard, a pointing device, a display, etc.) that enable interaction by a user with computer system 104.

Figure 2:
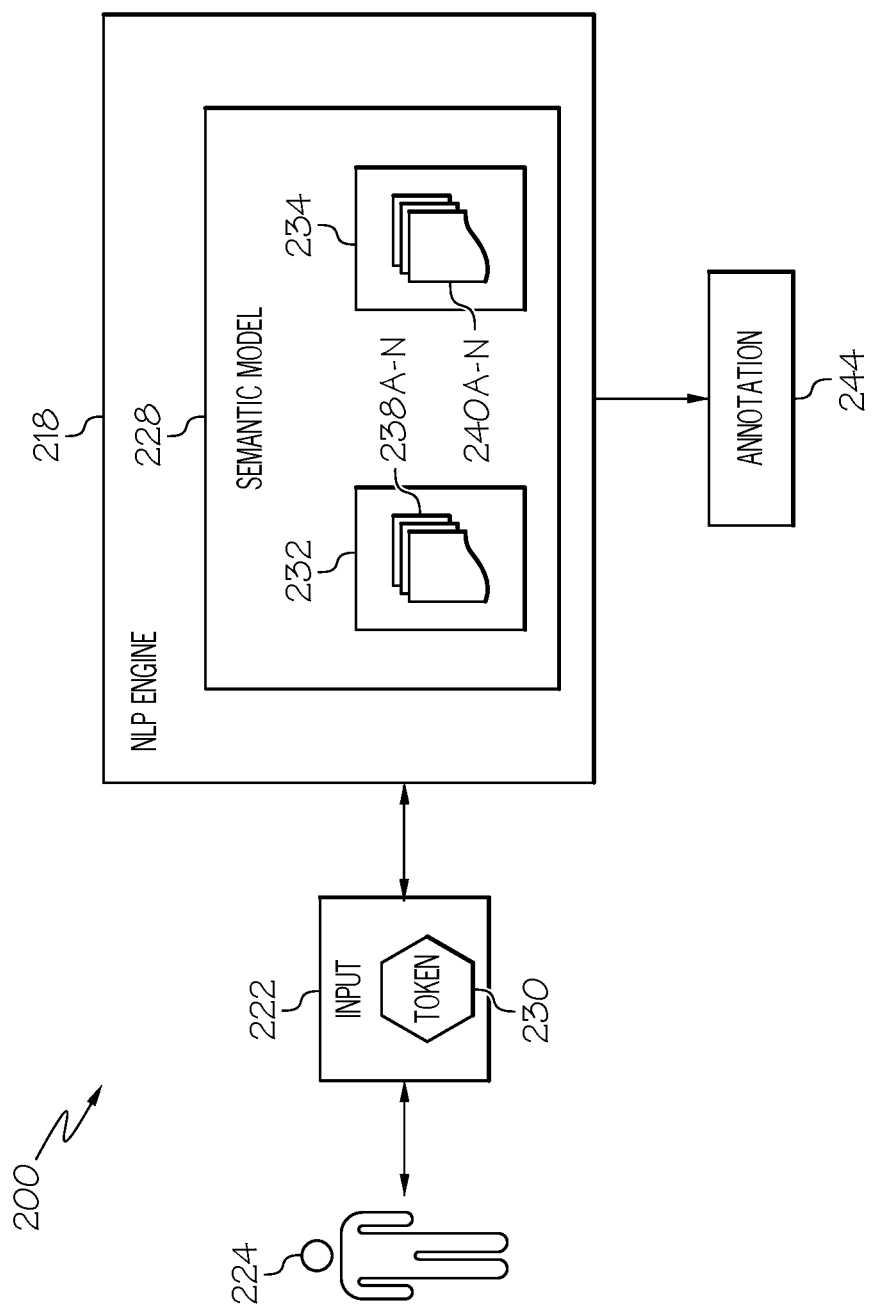
FIG. 2 shows a schematic of an exemplary NLP engine and its implementation according to illustrative embodiments.

Referring now to FIG. 2, operation of NLP engine 218 will be described in greater detail. As shown, FIG. 2 is a block diagram illustrating a system 200 that can be used for implementing NLP engine 218. System 200 provides the necessary components to provide contextual validation of synonyms in ontology driven NLP. As used herein, ontology driven NLP refers to the use of a semantic model to understand what exists in unstructured data. During use, ontology-driven NLP parses natural language text of an input 222 from a user 224 and transposes it into a representation of its meaning, structured around events and their participants as mentioned in the text and known to a semantic model 228 (e.g., an ontology model).

In an exemplary embodiment, input 222 comprises electronic text structured as a linear sequence of symbols (e.g., characters, words or phrases). Before any processing to input 222 is done, text needs to be segmented into one or more tokens 230, which are linguistic units such as words, punctuation, numbers, alpha-numerics, etc. Generating token 230 is a type of pre-processing used to identify basic units to be processed. In one embodiment, token 230 can be defined by a string or word delimited on both sides by spaces and/or punctuation, while in another embodiment, token 230 can be defined as something linguistically significant and/or methodologically useful.

Once input 222 containing token 230 is received at NLP engine 218, it is structured into semantic model 228, which comprises a set of classes 232 and 234 (e.g., data sets), each containing a set of related permutations 238A-N and 240A-N (e.g., members of the class as instance data) of token 230 (shown more clearly in FIG. 4 and described in greater detail below). Token 230 is then designated as a synonym of one of the related permutations 238A-N or 240A-N, and token 230 is annotated with annotation 244 (e.g., a semantic label providing context), which comprises either class 232 or 234, as corresponds to the related permutation that is synonymous with token 230. For example, if token 230 is set as a synonym for one of related permutations 238A-N, then class 232 is returned as annotation 244. Conversely, if token 230 is set as a synonym for one of related permutations 240A-N, then class 234 is returned as annotation 244. Annotation 244 is then validated, as described in greater detail below, by determining an accuracy of designation 244 of token 230 as a synonym of the selected permutation from related permutations 238A-N and 240A-N.

Figure 3:
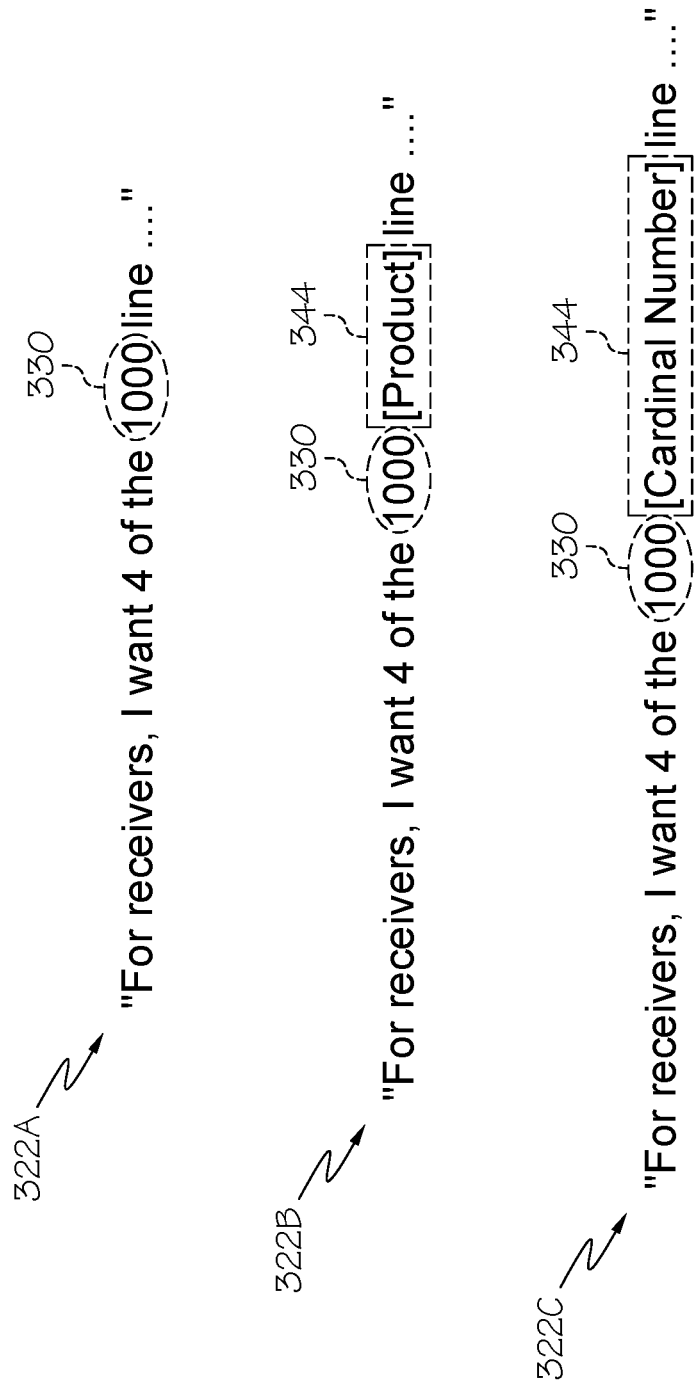
FIG. 3 shows a set of exemplary user inputs containing one or more tokens according to illustrative embodiments.

Referring now to FIG. 3, a set of exemplary inputs and tokens are shown. In a first example, input 322A is a textual statement "For receivers, I want 4 of the 1000 line." Here, input 322A and, in particular, number 1000, may be somewhat ambiguous, so it desirable to add context and understanding to this number. Therefore, the number 1000, which corresponds to token 330, is combined with annotation 344 as shown in inputs 322B and 322C, respectively Annotation 344 is added to token 330 by NLP engine 218 (FIG. 2), which is driven by semantic model 428 shown in FIG. 4. In one embodiment, semantic model 428 is an ontology model containing classes (e.g., entities) and predicates (e.g., relationships). Ontology classes are data sets, and can contain members (e.g., instance data corresponding to permutations of the token). Semantic model 428 allows users to ask questions about what is happening in a modeled system in a more natural way. Semantic model 428 can be leveraged as the functional core of an application to provide a navigable model of data and associated relationships that represent knowledge in a target domain.

A key value of semantic model 428 is providing access to information in context of the real world in a consistent way. In this embodiment, annotations 344 "Product" and "Number" shown in semantic model 428 are representative of ontology classes 432 and 434, respectively. A first set of permutations 438A-N (e.g., "Digital Receiver 1000, Digital Receiver, Receiver, 1000") and second set of permutations 440 of token 430 are representative of instance data (i.e., members of each ontology class 432 and 434). As shown, semantic model 428 designates token 430 as a synonym of "Digital Receiver 1000" using a relationship 460 (i.e., "hasSynonym"). During use, the NLP engine uses the instance data contained in semantic model 428 and, when the instance data is found in a user input, the class that contains the instance data will be used as the semantic annotation.

Once the annotation is performed, it is validated by determining an accuracy of the designation of the token as a synonym of the selected related permutation. As shown in FIG. 5, another relationship 562 is considered (i.e., "requiresContext"), and the ontology is restructured to include a knowledge structure 564. In general, knowledge structure 564 is an assembly of entities, relation types, triples, element types and knowledge objects. In knowledge structure 564, concepts, relation types, element types, knowledge objects, and triples themselves are all considered entities and can all be tied to another entity via a triple. In the case of triples being considered entities and taking part in triples, this is commonly known as "reification" of triples.

In the exemplary embodiment shown, knowledge structure 564 contains a contextual token 566 (i.e., "Receiver"), a linear distance represented as a relationship 570 between token 530 and contextual token 566 within user input 522, and the designation of token 530 as a synonym of the selected related permutation "Digital Receiver 1000." In this case, relationship 570 is a pre-specified linear distance limit, which may be user-defined, and is represented here by "hasKlimit 5". This implies the use of "1000" as a synonym for "Digital Receiver 1000" only if the token "Receiver" occurs elsewhere in the user input, i.e., within 5 words.

It will be appreciated that the format of knowledge structure 564 is structured as a reified triple to provide a way of expressing context against an existing relationship. The reified triple format of knowledge structure 564 provides contextual validation of relationship 560 (i.e., "hasSynonym") of token 530 as the synonym of the related permutation "Digital Receiver 1000" based on the linear distance relationship 570 and the relationship 562 introduced by contextual token 566. That is, knowledge structure 564 compares the linear distance between contextual token 566 and token 530 to the linear distance limit. As such, the user is able to express the appropriate linear distance for validation and utilizes the user-defined appropriate distance to impact confidence levels in the semantic annotation.

In one embodiment, the linear distance corresponds to a quantity of tokens (e.g., words) between the two target tokens in user input 522, i.e., contextual token 566 and token 530. As shown, the linear distance between "Receiver" and "1000" in input 522 is 3. So the k-limit of 5 means that the semantic annotation of "Digital Receiver 1000" is valid. The semantic annotation will be applied with the highest confidence level (100%). However, if the user types: "For receivers, I've been looking at a few, but primarily the 1000 line", the linear distance between "Receiver" and "1000" is 9. So the k-limit of 5 means that the semantic annotation of "Digital Receiver 1000" is not considered valid, and at least will have a lower confidence level, which can be quantified in any number of ways.

It will be appreciated that the approaches described herein may be carried out by computer system 104 (FIG. 1), which may be described in the general context of computer-executable instructions, such as program modules, being executed by a computer. Generally, program modules include routines, programs, people, components, logic, data structures, and so on, that perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 6:
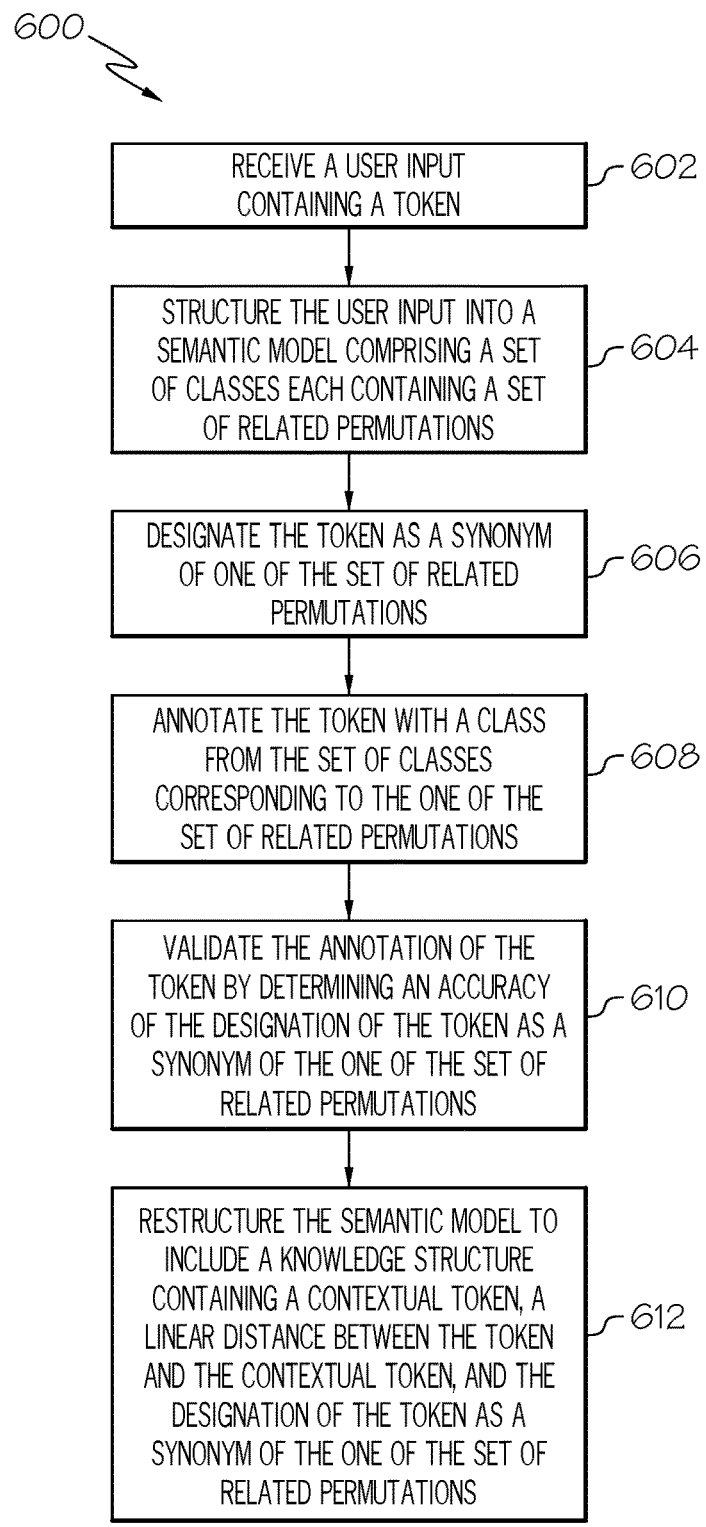
FIG. 6 shows a process flow for providing contextual validation of synonyms in ontology driven natural language processing according to illustrative embodiments.

The program modules carry out the methodologies disclosed herein, as shown in FIG. 6. Depicted is a process 600 for providing contextual validation of synonyms in ontology driven natural language processing, wherein, at 602, a user input containing one or more tokens is received. At 604, the user input is structured into a semantic model comprising a set of classes each containing a set of related permutations of the token. Next, at 606, the token is designated as a synonym of one of the set of related permutations, and the token is annotated with a class from the set of classes corresponding to the one of the set of related permutations at 608. The annotation is then validated by determining an accuracy of the designation of the token as a synonym of the one of the set of related permutations at 610. Finally, at 612, the semantic model is restructured to include a knowledge structure containing a contextual token, a linear distance between the token and the contextual token, and the designation of the token as a synonym of the one of the set of related permutations.

The flowchart of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of the flowchart illustration can be implemented by special purpose hardware-based systems that perform the specified functions or acts, or combinations of special purpose hardware and computer instructions.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax that, when executed, may cause a processor to perform a corresponding set of operations.

For example, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer-readable storage device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided an approach for providing contextual validation of synonyms in ontology driven natural language processing. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for providing contextual validation of synonyms in ontology driven natural language processing, the method comprising the computer-implemented steps of:
    receiving, via at least one computing device, a user input of electronic text structured as a linear sequence of symbols;
    determining, via at least one computing device, based on the linear sequence of symbols, a token that identifies a linguistic unit of the electronic text, the linguistic unit comprising at least one of a word, a punctuation symbol, a number, or a letter;
    structuring, via at least one computing device, the user input into a semantic model comprising a set of classes each containing a set of related permutations of the token, wherein the semantic model is stored as data in memory of the at least one computing device;
    quantifying, via at least one computing device, a linear distance between the token and a contextual token within the user input, wherein the linear distance is a quantity of additional tokens in between the token and the contextual token;
    comparing, via at least one computing device, the linear distance to a pre-specified linear distance limit to a number of words;
    when, based on the comparing, the quantified linear distance is within the pre-specified linear distance limit to the number of words,
        assigning a high confidence level to an annotation of the token, and
        validating the annotation based on the high confidence level, wherein the validating the annotation comprises restructuring, via at least one computing device, the semantic model to include a knowledge structure containing the contextual token, the linear distance, the pre-specified linear distance limit, and the designation of the token as a synonym of the one of the set of related permutations; and
    when, based on the comparing, the quantified linear distance is not within the pre-specified linear distance limit to the number of words, assigning a low confidence level to the annotation.

2. The method according to claim 1, wherein the token is defined by a string or word delimited on both sides by spaces or punctuation.

3. The method according to claim 1, wherein the token is defined as an item that is linguistically significant.

4. The method according to claim 1, wherein the pre-specified linear distance limit is user-defined.

5. The method according to claim 2, wherein the linear distance corresponds to a quantity of tokens.

6. The method according to claim 1, further comprising the computer-implemented step of parsing the user input.

7. The method according to claim 1, wherein a solution service provider deploys a computer infrastructure operable to perform the method.

8. A system for providing contextual validation of synonyms in ontology driven natural language processing (NLP), the system comprising:
    a memory medium comprising instructions;
    a bus coupled to the memory medium; and
    a processor coupled to a NLP engine via the bus that when executing the instructions causes the system to:
        receive a user input of electronic text structured as a linear sequence of symbols;
        determine, based on the linear sequence of symbols, a token that identifies a linguistic unit of the electronic text, the linguistic unit comprising at least one of a word, a punctuation symbol, a number, or a letter;
        structure the user input into a semantic model comprising a set of classes each containing a set of related permutations of the token, wherein the semantic model is stored as data in memory of the at least one computing device;
        quantify a linear distance between the token and a contextual token within the user input, wherein the linear distance is a quantity of additional tokens in between the token and the contextual token;
        compare the linear distance to a pre-specified linear distance limit to a number of words;
        when, based on the comparing, the quantified linear distance is within the pre-specified linear distance limit to the number of words,
            assign a high confidence level to an annotation of the token, and validate the annotation based on the high confidence level, wherein the validating the annotation comprises restructuring the semantic model to include a knowledge structure containing the contextual token, the linear distance, the pre-specified linear distance limit, and the designation of the token as a synonym of the one of the set of related permutations; and when, based on the comparing, the quantified linear distance is not within the pre-specified linear distance limit to the number of words, assign a low confidence level to the annotation.

9. The system according to claim 8, wherein the token is defined by a string or word delimited on both sides by spaces or punctuation.

10. The system according to claim 8, wherein the token is defined as an item that is linguistically significant.

11. The system according to claim 8, wherein the pre-specified linear distance limit is user-defined.

12. The system according to claim 8, the linear distance corresponding to a quantity of tokens.

13. The system according to claim 8, further comprising instructions to parse the user input.

14. A computer-readable storage device storing computer instructions, which when executed, enables a computer system to provide contextual validation of synonyms in ontology driven natural language processing (NLP), the computer instructions comprising:

receive a user input of electronic text structured as a linear sequence of symbols;

determine, based on the linear sequence of symbols, a token that identifies a linguistic unit of the electronic text, the linguistic unit comprising at least one of a word, a punctuation symbol, a number, or a letter;

structure the user input into a semantic model comprising a set of classes each containing a set of related permutations of the token, wherein the semantic model is stored as data in memory of the at least one computing device;

quantify a linear distance between the token and a contextual token within the user input, wherein the linear distance is a quantity of additional tokens in between the token and the contextual token;

compare the linear distance to a pre-specified linear distance limit to a number of words;

when, based on the comparing, the quantified linear distance is within the pre-specified linear distance limit to the number of words,
  assign a high confidence level to an annotation of the token, and
  validate the annotation based on the high confidence level, wherein the validating the annotation comprises restructuring the semantic model to include a knowledge structure containing the contextual token, the linear distance, the pre-specified linear distance limit, and the designation of the token as a synonym of the one of the set of related permutations; and when, based on the comparing, the quantified linear distance is not within the pre-specified linear distance limit to the number of words, assign a low confidence level to the annotation.

15. The computer-readable storage device according to claim 14, wherein the token is defined by a string or word delimited on both sides by spaces or punctuation.

16. The computer-readable storage device according to claim 14, wherein the token is defined as an item that is linguistically significant.

17. The computer-readable storage device according to claim 14, wherein the pre-specified linear distance limit is user-defined.

18. The computer-readable storage device according to claim 14, the linear distance corresponding to a quantity of tokens.

19. The computer-readable storage device according to claim 14, the computer instructions further comprising parsing the user input.

20. The computer-readable storage device according to claim, 19, wherein the parsing is performed prior to the structuring.

* * * * *